US009813171B1

(12) United States Patent
Fabery

(10) Patent No.: US 9,813,171 B1
(45) Date of Patent: Nov. 7, 2017

(54) SATELLITE RADIO TRANSFER METHOD

(71) Applicant: United Radio, Inc., East Syracuse, NY (US)

(72) Inventor: Michael Fabery, Clay, NY (US)

(73) Assignee: United Radio, Inc., East Syracuse, NY (US)

( * ) Notice: Subject to any disclaimer, the term of this patent is extended or adjusted under 35 U.S.C. 154(b) by 0 days.

(21) Appl. No.: 15/200,827

(22) Filed: Jul. 1, 2016

(51) Int. Cl.
*G06Q 30/06* (2012.01)
*G06Q 10/02* (2012.01)
*H04H 20/22* (2008.01)

(52) U.S. Cl.
CPC .................................. *H04H 20/22* (2013.01)

(58) Field of Classification Search
CPC .... H04L 12/2818; H04W 4/008; H04W 4/12; H04W 84/12; H04W 88/02
See application file for complete search history.

(56) References Cited

U.S. PATENT DOCUMENTS 8,160,581 B2 * 4/2012 Zoeckler ................. H04W 8/26 379/15.03
8,428,569 B2 * 4/2013 Rysenga ............... H04W 8/265 455/414.1
9,108,579 B2 * 8/2015 Camacho .............. B60R 16/037
2006/0217109 A1 * 9/2006 Sobb ...................... G07C 5/008 455/414.1
2006/0240811 A1 * 10/2006 De Luca ................. H04W 8/18 455/414.3
2007/0298737 A1 * 12/2007 Reynolds ............... H04H 40/90 455/152.1
2014/0342726 A1 * 11/2014 Smereka ............... H04W 12/08 455/420
2015/0112736 A1 * 4/2015 Chan ...................... G06Q 10/02 705/5
2015/0365817 A1 * 12/2015 Chu ...................... H04W 8/183 455/41.2
2017/0228945 A1 * 8/2017 Lee ........................ G07C 5/008

* cited by examiner

*Primary Examiner* — Bobbak Safaipour
(74) *Attorney, Agent, or Firm* — Bond Schoeneck & King, PLLC; George McGuire; Blaine Bettinger

(57) ABSTRACT

A method for adding a new radio receiver to a subscriber account includes the steps of: receiving a request to add a new radio receiver to the subscriber's account; selecting a new radio receiver to be added to the subscriber's account, the new radio receiver comprising an electronic serial number specific to the radio receiver; automatically establishing, by the transfer program, a communications link with a radio provider; automatically communicating, to the radio provider by the transfer program via the communications link, a request to add, to the subscriber's account, the electronic serial number specific to the radio receiver; and automatically confirming, with the radio provider via the communications link, that the new electronic serial number specific to the radio receiver has successfully been added to the subscriber's account.

16 Claims, 2 Drawing Sheets

SATELLITE RADIO TRANSFER METHOD

FIELD OF THE INVENTION

The present invention relates to methods and systems for satellite radio receivers, and more specifically to methods and systems for removing an existing receiver and adding a new receiver to a satellite radio subscriber account.

BACKGROUND

Satellite radio is an ever-growing subscription-based service that provides audio programming to people around the world. Ground-based stations transmit programming to satellites that are typically in geostationary orbit above the equator. The satellites receive the signals and transmit them back down to radio receivers in vehicles, homes, and other locations. The transmitted signal contains the scrambled programming with metadata about the broadcast. An authorized radio receiver receives the scrambled programming and metadata, and then unscrambles the data and plays the programming for the listener.

Accordingly, satellite radio subscribers purchase or receive a radio receiver and pay for a subscription in order to receive and unscramble the programming. The receiver can be a portable receiver in a vehicle, or can be a fixed or semi-permanent receiver such as a home- or office-based receiver.

The satellite radio receiver comprises an electronic serial number (ESN) that identifies that satellite radio receiver. For the satellite radio receiver to function properly, i.e., in order for the satellite radio receiver to unscramble programming for the subscriber, the satellite radio receiver must be associated with an active subscriber account. Sometimes, an existing subscriber will require a new satellite radio receiver. When a subscriber transfers to a new satellite radio receiver, due to either a defective receiver, a new vehicle, or changing to an upgraded receiver, the old receiver must be removed from the subscriber's account and the new receiver must be added. This will ensure that the old receiver is no longer used, and will ensure that the new receiver is activated and able to unscramble programming for the subscriber.

Current methods for removing an existing receiver and adding a new receiver are complicated and require multiple steps, as well as prolonged direct interaction with the satellite radio receiver. Accordingly, there is a continued need in the art for improved efficient methods and systems removing an existing receiver and adding a new receiver to a satellite radio subscriber account.

SUMMARY OF THE INVENTION

The present disclosure is directed to methods and systems for removing an existing receiver and adding a new receiver to a satellite radio subscriber account. For example, the method comprises automated steps that greatly reduce the amount of time required for, and the efficiency of, transferring, removing, and adding satellite radio receivers within an account.

According to an aspect is a method for adding a new radio receiver to a subscriber account. The method includes the steps of: (i) receiving a request to add a new radio receiver to the subscriber's account; (ii) selecting a new radio receiver to be added to the subscriber's account, the new radio receiver comprising an electronic serial number specific to the radio receiver; (iii) automatically establishing, by the transfer program, a communications link with a radio provider; (iv) automatically communicating, to the radio provider by the transfer program via the communications link, a request to add, to the subscriber's account, the electronic serial number specific to the radio receiver; and (v) automatically confirming, with the radio provider via the communications link, that the new electronic serial number specific to the radio receiver has successfully been added to the subscriber's account.

According to an embodiment, the request is received from a vehicle dealership.

According to an embodiment, the method further includes the step of retrieving information about the request from an order database, the information comprising a vehicle identification number.

According to an embodiment, the communications link is a wired and/or wireless communications link, and can only be established upon authorization.

According to an embodiment, the method further includes the step of automatically communicating, to the radio provider by the transfer program via the communications link, a request to remove from the subscriber's account an electronic serial number specific to the subscriber's previous radio receiver.

According to an embodiment, the method further includes the steps of: communicating additional information about the order to the radio provider if the new electronic serial number specific to the radio receiver was not successfully added to the subscriber's account; confirming, with the radio provider via the communications link, that the new electronic serial number specific to the radio receiver has been successfully added to the subscriber's account.

According to an aspect is a system for adding a new radio receiver to a subscriber account. The system includes: a transferring entity configured to receive a request to add a new radio receiver to a subscriber's account, the transferring entity comprising: (i) a new radio receiver comprising an electronic serial number specific to the radio receiver; and (ii) a processor. The processor is configured to: (i) receive a request to add the new radio receiver to the subscriber's account; (ii) select a new radio receiver to be added to the subscriber's account, the new radio receiver comprising an electronic serial number specific to the radio receiver; (iii) establish a communications link with a radio provider; (iv) communicate, to the radio provider by the transfer program via the communications link, a request to add, to the subscriber's account, the electronic serial number specific to the radio receiver; and (v) confirm, with the radio provider via the communications link, that the new electronic serial number specific to the radio receiver has successfully been added to the subscriber's account.

According to an embodiment, the system further includes at least a portion of a communications network over which the communications link is established. According to an embodiment, the communications link is a wired and/or wireless communications link, and can only be established upon authorization.

According to an aspect is a non-transitory storage medium comprising a computer program configured to add a new radio receiver to a subscriber account. The computer program is configured to perform the steps of: (i) receiving a request to add a new radio receiver to the subscriber's account; (ii) selecting a new radio receiver to be added to the subscriber's account, the new radio receiver comprising an electronic serial number specific to the radio receiver; (iii) establishing, by the transfer program, a communications link with a radio provider; (iv) communicating, to the radio provider by the transfer program via the communications link, a request to add, to the subscriber's account, the electronic serial number specific to the radio receiver; and (v) confirming, with the radio provider via the communications link, that the new electronic serial number specific to the radio receiver has successfully been added to the subscriber's account.

These and other aspects of the invention will be apparent from reference to the embodiments described hereinafter.

BRIEF DESCRIPTION OF THE DRAWINGS

The present invention will be more fully understood and appreciated by reading the following Detailed Description in conjunction with the accompanying drawings, in which.

DETAILED DESCRIPTION

The present disclosure describes various embodiments of a method and system for removing an existing receiver and adding a new receiver to a satellite radio subscriber account. The method comprises a satellite radio provider and a transferring entity using a transfer program. The transferring entity communicates directly with the satellite radio provider to add a new satellite radio receiver to a subscriber's account. The new satellite radio receiver may be necessary because of a new vehicle purchase, a faulty existing device, or an upgrade, among many other options. Typically, the transferring entity utilizes a transfer program with a user interface that simplifies the transfer process, and access to a wired and/or wireless communications system in order to communicate with the satellite radio provider.

Figure 1:
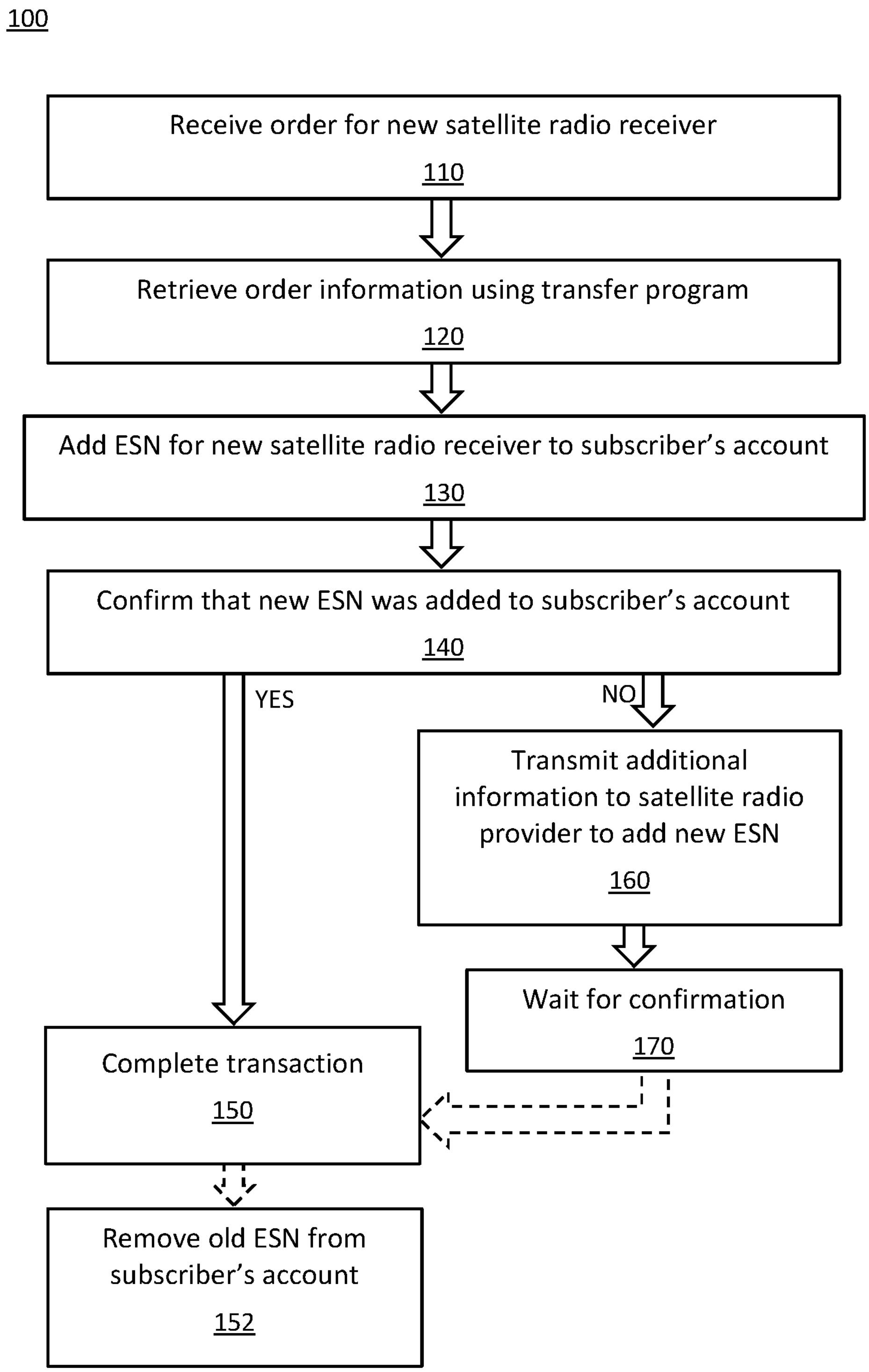
FIG. 1 is a flowchart of a method for removing an existing receiver and adding a new receiver to a satellite radio subscriber account, in accordance with an embodiment.

Referring to FIG. 1, in one embodiment, is a flowchart of a method 100 for removing an existing receiver and/or adding a new receiver to a satellite radio subscriber account. At step 110, an order for a new satellite radio receiver is received by a transferring entity. The order can be received electronically, in the mail, or from any other source or location. Orders can be received one at a time or in bulk. Orders may be received from, for example, a vehicle dealership. An individual may buy a new car and need to transfer their existing satellite radio subscription from their current radio receiver in their existing vehicle to a new radio receiver in the new vehicle. As another example, an individual might go to a car dealership with a faulty or old radio receiver and will need to replace the receiver or upgrade to a new receiver.

An order will typically include a user's name and/or subscription information, an order number, the vehicle identification number (VIN) of the vehicle containing the radio receiver, and an electronic serial number (ESN) that identifies the user's existing satellite radio receiver. Other information may also be included in the order.

At step 120, a transfer program is used to automatically retrieve information about the order. First, the order can be entered into the transfer program. For example, an entity responsible for removing an existing receiver and adding a new receiver to a satellite radio subscriber account can receive the order and can enter one or more pieces of information from that order into a transfer program. For example, the entity can enter the order number into the transfer program. The automated transfer program then retrieves information about the order from an order or account database. Accordingly, the automated transfer program will be in communication with an order or account database, preferably from the satellite radio provider. The access to the database can be, for example, through an authorized API or other access means. The automated transfer program will thus have a connection to a wired and/or wireless network through which it can communicate with the satellite radio provider about the user's account, subscription, and/or other information. After communicating with the satellite radio provider, the automated transfer program will have all of the information necessary to perform the required transfer.

At step 130 of the method, the user uses the transfer program to add a new electronic serial number (ESN) for a satellite radio receiver to the subscriber's account. For example, the user can enter the new ESN into the transfer program user interface, and that information is communicated to the satellite radio provider or the account manager for the satellite radio provider, and the subscriber's information is updated. Typically, the new ESN is added to the subscriber's account and the subscriber will temporarily have two ESNs (or, alternatively, the prior existing number of ESNs plus the new ESN) associated with their account. Accordingly, at this step, the transfer program will again establish contact with the satellite radio provider, or will utilize an existing connection, in order to request that the satellite radio provider add the new ESN to the subscriber's account.

At step 140 of the method, the user inquires whether the new ESN was added to the subscriber's account. Accordingly, at this step, the transfer program will again establish contact with the satellite radio provider, or will utilize an existing connection, in order to query the database and determine whether the new ESN has been added to the subscriber's account.

If the satellite radio provider confirms that the new ESN was added to the subscriber's account, then the transaction may be completed at step 150. Alternatively, the transfer program may put the transaction on a temporary hold for a predetermined amount of time. During that time, the system can confirm that the new satellite radio receiver is configured and ready to receive and process programming.

At optional step 152 of the method, the old ESN is removed from the subscriber's account, either passively or actively. The old ESN can be actively removed by, for example, by the transfer program or the entity sending a request to the satellite radio provider to remove the old ESN from the subscriber's account. For example, the entity can send the request to remove the old ESN from the subscriber's account once the entity receives the old satellite radio receiver from the dealer. According to this embodiment, the dealer sends the removed or faulty radio receiver to the entity after or with the order. When the entity receives the removed radio receiver, it can process the request to remove the ESN associated with that removed radio receiver from the subscriber's account. The communication can be by mail, email, telephone, electronic communication, or any other transmission means.

Alternatively, the old ESN can be removed passively. For example, the old ESN may automatically be removed from the subscriber's account after an expired period of time, such as 30 days, although any time period is possible.

If the satellite radio provider responds to the entity request with an indication that the new ESN could not be or was not added to the subscriber's account, then at step 160 of the method, additional information about the order is transmitted to the satellite radio provider so that the new ESN can be added. The information can include, for example, the subscriber's information, the order number, the VIN, the old ESN, the new ESN, and any other necessary or helpful information. The communication can be by mail, email, telephone, electronic communication, or any other transmission means.

At step 170 of the method, the system waits for confirmation from the satellite radio provider that the new ESN has been added to the subscriber's account. The communication can be by mail, email, telephone, electronic communication, or any other transmission means. The system can then proceed to step 150 of the method.

Figure 2:
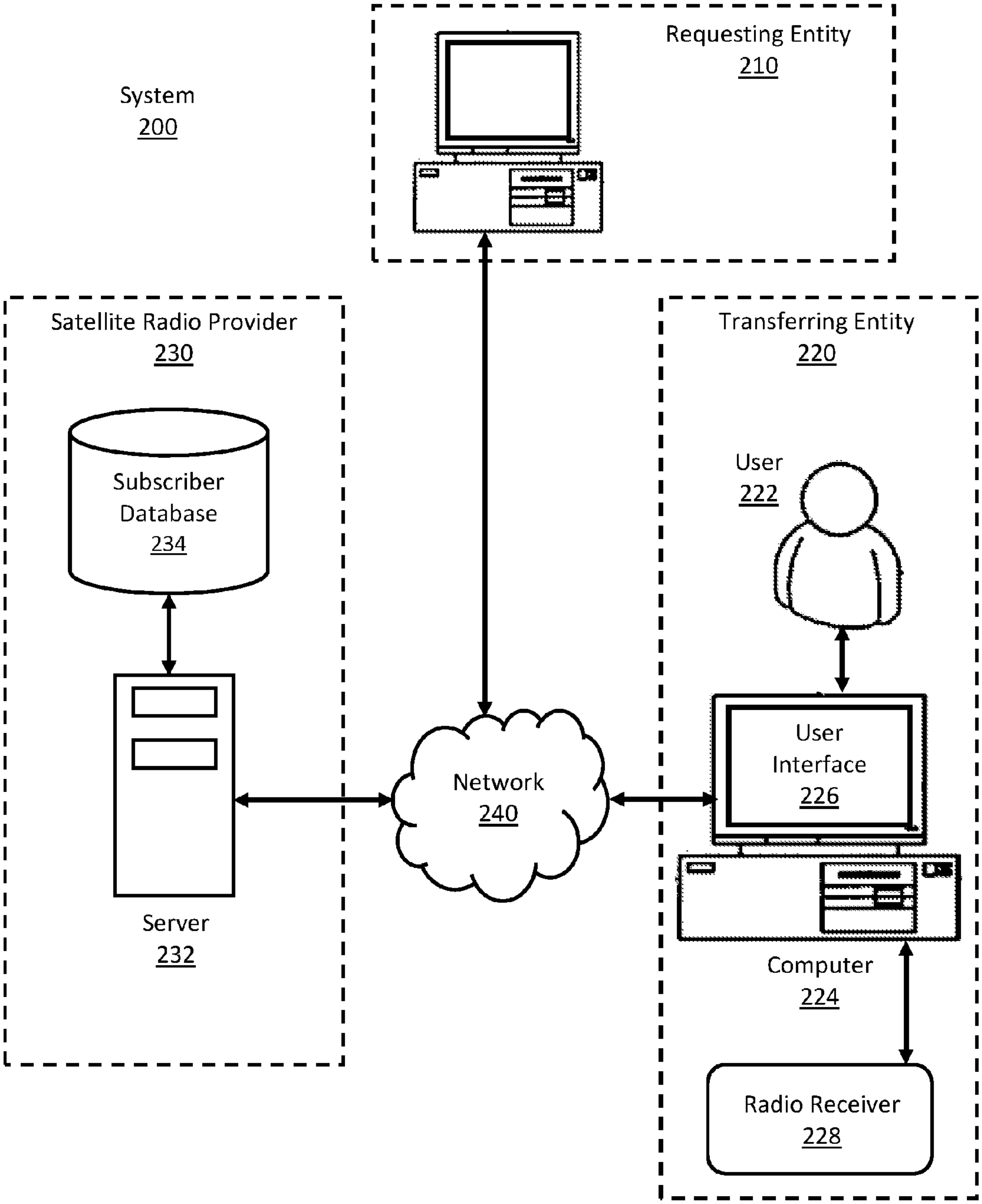
FIG. 2 is a schematic representation of a system for removing an existing receiver and adding a new receiver to a satellite radio subscriber account, in accordance with an embodiment.

Referring to FIG. 2, in one embodiment, is a system 200 for removing an existing receiver and/or adding a new receiver to a satellite radio subscriber account. According to an embodiment, the system comprises a requesting entity 210, a transferring entity 220, a satellite radio provider 230, and a wired and/or wireless communications network 240. The requesting entity 210, transferring entity 220, and/or satellite radio provider 230 are in communication with one or two of the other components of the system via the wired and/or wireless communications network 240, although other methods of communication and information transfer are possible.

According to an embodiment, requesting entity 210 is a vehicle dealership or any other entity that sells, rents, or transfers satellite radio receivers to and/or from subscribers. For example, requesting entity 210 is a vehicle dealership that provides new satellite radio receivers for upgrading, or sells vehicles with satellite radio receivers.

According to an embodiment, transferring entity 220 is any entity that receives requests or orders from the requesting entity 210 to add a new satellite radio receiver to a subscriber's account, and/or receives a request or an order to remove a satellite radio receiver from a subscriber's account. For example, transferring entity 220 may be an entity that contracts with or otherwise engages with the requesting entity 210 to process orders.

The transferring entity 220 comprises, for example, one or more users 222 who are involved in or responsible for interacting via user interface 226 with the transfer program, executed on one or more computers 224. The user can receive one or more orders and input those orders into the system via user interface 226. Transfer program can be stored in memory on computer 224, and can be executed by computer 224, for example. According to an embodiment, the transfer program and user interface present a series of predetermined or pre-programmed prompts to the user 222 which lead the user through the steps of the method. The user interface can communicate with the user by prompts, sounds, icons, or any of a wide variety of other communication means.

According to an embodiment, the transferring entity 220 comprises one or more new satellite radio receivers 228. For example, the transferring entity 220 can be a storehouse of new satellite radio receivers waiting for activation and/or being added to a subscriber's account. Thus, when the entity receives a request for a new satellite radio receiver to be added to a subscriber's account, the entity retrieves a new or unused radio receiver from its store and uses that new radio receiver and its ESN. Accordingly, the satellite radio receiver will interface directly with the computer 224 in order to provide the system with its ESN and/or any other information. The interface can be, for example, any wired and/or wireless interface, interaction, or communication between the new satellite radio receiver and the computer. According to an embodiment, a plurality of radio receivers can be temporarily connected to the computer 224 via a network in order to process a plurality of orders simultaneously or nearly simultaneously.

According to an embodiment, the satellite radio provider 230 is any known or future satellite radio provider. As described or otherwise envisioned herein, the satellite radio provider is any entity that creates, processes, or otherwise transmits programming using one or more satellites. However, the satellite radio provider 230 may also be an entity that creates, processes, and/or otherwise transmits programming using a variety of other means. Accordingly, the satellite radio provider 230 may alternatively be referred to as simply a programming provider 230. For example, a programming provider 230 may provide programming via a variety of other wired and/or wireless means. As just one example, scrambled programming may be wirelessly transmitted from a ground-based provider to one or more high-altitude balloons located in the stratosphere or elsewhere in the atmosphere, where it is then transmitted back to the ground where authorized programming receivers receive and unscramble the scrambled programming. Many other systems for simultaneously transmitting scrambled programming to a plurality of receivers are currently possible and will be developed. These systems are within the scope of the present invention.

According to an embodiment, the satellite radio provider comprises a server 232 which receives communication from and transmits communication to network 240. The server 232 can be any computer, server, or other component capable of communication and information processing. The satellite radio provider 230 also comprises a subscriber database 234 which contains information about the provider's subscribers. The information may be, for example, subscriber names, one or more ESNs associated with the account, payment information, and any of a wide variety of other information.

According to an embodiment, the network 240 is a wired and/or wireless network. For example, the network can comprise, at least in part, an online component such as the Internet. The network 240 may also or alternatively be a telephone connection, a hard-wired connection, or any of a variety of other connections or networks.

As will be appreciated by one skilled in the art, aspects of the present invention may be embodied/implemented as a computer system, method or computer program product. The computer program product can have a computer processor or neural network, for example, that carries out the instructions of a computer program. Accordingly, aspects of the present invention may take the form of an entirely hardware embodiment, an entirely software embodiment, and entirely firmware embodiment, or an embodiment combining software/firmware and hardware aspects that may all generally be referred to herein as a "circuit," "module," "system," or an "engine." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction performance system, apparatus, or device.

The program code may perform entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowcharts/block diagrams in the Figures illustrate the architecture, functionality, and operation of possible implementations of systems, methods, and computer program products according to various embodiments of the present invention. In this regard, each block in the flowcharts/block diagrams may represent a module, segment, or portion of code, which comprises instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method for changing a first satellite radio receiver, comprising a first electronic serial number, associated with a vehicle to a new satellite radio receiver, the method comprising the steps of:

receiving a request from a vehicle dealership to change a first satellite radio receiver associated with a vehicle to a new satellite radio receiver;

selecting a new satellite radio receiver to be added to the vehicle, the new satellite radio receiver comprising an electronic serial number specific to the new satellite radio receiver;

automatically establishing, by a transfer program, a communications link with a radio provider;

automatically communicating, to the radio provider by the transfer program via the communications link, a request to associate with the vehicle, the electronic serial number specific to the new satellite radio receiver;

automatically confirming, with the radio provider via the communications link, that the new electronic serial number specific to the new satellite radio receiver has successfully been associated with the vehicle, wherein both the first electronic serial number of the first satellite radio receiver and the electronic serial number of the new satellite radio receiver are temporarily associated with the vehicle at the same time; and removing, after confirming that the electronic serial number of the new satellite radio receiver is associated with the vehicle, the first electronic serial number of the first satellite radio receiver from an association with the vehicle.

2. The method of claim 1, further comprising the step of retrieving information about the request from an order database, the information comprising a vehicle identification number.

3. The method of claim 1, wherein the communications link is a wired and/or wireless communications link, and can only be established upon authorization.

4. The method of claim 1, further comprising the step of automatically communicating, to the radio provider by the transfer program via the communications link, a request to remove the first electronic serial number from an association with the vehicle.

5. The method of claim 1, further comprising the steps of:

communicating additional information about the order to the radio provider if the new electronic serial number specific to the radio receiver was not successfully added to the vehicle;

confirming, with the radio provider via the communications link, that the new electronic serial number specific to the new satellite radio receiver has been successfully added to the vehicle.

6. A system for changing a first satellite radio receiver, comprising a first electronic serial number, associated with a vehicle to a new satellite radio receiver, the system comprising:

a transferring entity configured to receive a request from a vehicle dealership to change a first satellite radio receiver associated with a vehicle to a new satellite radio receiver, the transferring entity comprising: (i) information about the new satellite radio receiver comprising an electronic serial number specific to the new radio satellite receiver; and (ii) a processor;

wherein the processor is configured to: (i) receive the request from the vehicle dealership to change the first satellite radio receiver to the new satellite radio receiver; (ii) select information about the new satellite radio receiver to be added to the vehicle the subscriber's account, the new satellite radio receiver comprising an electronic serial number specific to the satellite radio receiver; (iii) establish a communications link with a radio provider; (iv) communicate, to the radio provider by the transfer program via the communications link, a request to associate with the vehicle, the electronic serial number specific to the new satellite radio receiver; (v) confirm, with the radio provider via the communications link, that the new electronic serial number specific to the new satellite radio receiver has successfully been associated with the vehicle, wherein both the first electronic serial number of the first satellite radio receiver and the electronic serial number of the new satellite radio receiver are temporarily associated with the vehicle at the same time; and (vi) remove, after confirming that the electronic serial number of the new satellite radio receiver is associated with the vehicle, the first electronic serial number of the first satellite radio receiver from an association with the vehicle.

7. The system of claim 6, further comprising at least a portion of a communications network over which the communications link is established.

8. The system of claim 6, wherein the processor is further configured to retrieve information about the request from an order database, the information comprising a vehicle identification number.

9. The system of claim 6, wherein the communications link is a wired and/or wireless communications link, and can only be established upon authorization.

10. The system of claim 6, wherein the processor is further configured to communicate, to the radio provider via the communications link, a request to remove the first electronic serial number from an association with the vehicle.

11. The system of claim 6, wherein the processor is further configured to: communicate additional information about the order to the radio provider if the new electronic serial number specific to the radio receiver was not successfully added to the vehicle; and confirm, with the radio provider via the communications link, that the new electronic serial number specific to the new satellite radio receiver has been successfully added to the vehicle.

12. A non-transitory storage medium comprising a computer program, the computer program configured to perform the steps of:

receiving a request from a vehicle dealership to change a first satellite radio receiver associated with a vehicle to a new satellite radio receiver;

selecting a new satellite radio receiver to be added to the subscriber's account, the new satellite radio receiver comprising an electronic serial number specific to the new satellite radio receiver;

automatically establishing, by a transfer program, a communications link with a radio provider;

automatically communicating, to the radio provider by the transfer program via the communications link, a request to associate with the vehicle, the electronic serial number specific to the new satellite radio receiver;

automatically confirming, with the radio provider via the communications link, that the new electronic serial number specific to the new satellite radio receiver has successfully been associated with the vehicle, wherein both the first electronic serial number of the first satellite radio receiver and the electronic serial number of the new satellite radio receiver are temporarily associated with the vehicle at the same time; and removing, after confirming that the electronic serial number of the new satellite radio receiver is associated with the vehicle, the first electronic serial number of the first satellite radio receiver from an association with the vehicle.

13. The non-transitory storage medium of claim 12, wherein the computer program is further configured to retrieve information about the request from an order database, the information comprising a vehicle identification number.

14. The non-transitory storage medium of claim 12, wherein the communications link is a wired and/or wireless communications link, and can only be established upon authorization.

15. The non-transitory storage medium of claim 12, wherein the computer program is further configured to communicate, to the radio provider by the transfer program via the communications link, a request to remove the first electronic serial number from an association with the vehicle.

16. The non-transitory storage medium of claim 12, wherein the computer program is further configured to: communicate additional information about the order to the radio provider if the new electronic serial number specific to the radio receiver was not successfully added to the vehicle; and confirm, with the radio provider via the communications link, that the new electronic serial number specific to the new satellite radio receiver has been successfully added to the vehicle.

* * * * *